(12) United States Patent
Eberling

(10) Patent No.: US 8,260,520 B2
(45) Date of Patent: Sep. 4, 2012

(54) HEAVY VEHICLE TRAILER ABS MODULE

(75) Inventor: Charles E. Eberling, Wellington, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 841 days.

(21) Appl. No.: 12/259,473

(22) Filed: Oct. 28, 2008

(65) Prior Publication Data

US 2010/0106388 A1    Apr. 29, 2010

(51) Int. Cl.
    *B60T 7/12*    (2006.01)
    *G05D 1/00*    (2006.01)
    *G06F 7/00*    (2006.01)
    *G06F 17/00*    (2006.01)

(52) U.S. Cl. ......................................................... 701/81

(58) Field of Classification Search ................. 303/9.66, 303/69, 15, 3; 307/7; 701/1, 81, 70, 74
See application file for complete search history.

(56) References Cited

U.S. PATENT DOCUMENTS

| | | | |
|---|---|---|---|
| 4,586,756 A | | 5/1986 | Hintner |
| 5,346,292 A | * | 9/1994 | Hall ............................... 303/156 |
| 5,979,503 A | | 11/1999 | Abboud et al. |
| 6,179,096 B1 | | 1/2001 | Kinerson et al. |
| 6,209,971 B1 | | 4/2001 | Ho et al. |
| 6,386,649 B1 | | 5/2002 | Ross |
| 6,883,875 B2 | | 4/2005 | Tate et al. |
| 7,255,122 B2 | | 8/2007 | Ho et al. |
| 7,395,906 B2 | * | 7/2008 | Potter et al. .................... 188/170 |
| 2005/0057088 A1 | * | 3/2005 | Washington ..................... 303/69 |
| 2010/0066161 A1 | * | 3/2010 | Fry et al. ....................... 303/9.66 |

FOREIGN PATENT DOCUMENTS

JP    8058546    3/1996

* cited by examiner

*Primary Examiner* — James Trammell
*Assistant Examiner* — Kyle K Tsui
(74) *Attorney, Agent, or Firm* — Calfee, Halter & Griswold LLP

(57) ABSTRACT

A heavy vehicle trailer antilock braking system module includes a module control port receiving a pressure signal, a module exhaust port fluidly communicating with atmosphere, a first switching valve, a second switching valve, a relay valve, and control logic. The first switching valve includes an input port and an output port. The first switching valve input port fluidly communicates with the module control port. The second switching valve includes an input port and an output port. The second switching valve output port fluidly communicates with the module exhaust port. A relay valve includes a supply port, a delivery port, an exhaust port, and a control port. The relay valve control port fluidly communicates with the first switching valve output port and the second switching valve input port. The delivery port fluidly communicates with the supply port and the exhaust port as a function of a pressure signal at the relay valve control port. Control logic causes the second switching valve input port to fluidly communicate with the second switching valve output port for a predetermined time after electrical power is no longer supplied to a vehicle service brake stop lamp.

10 Claims, 1 Drawing Sheet

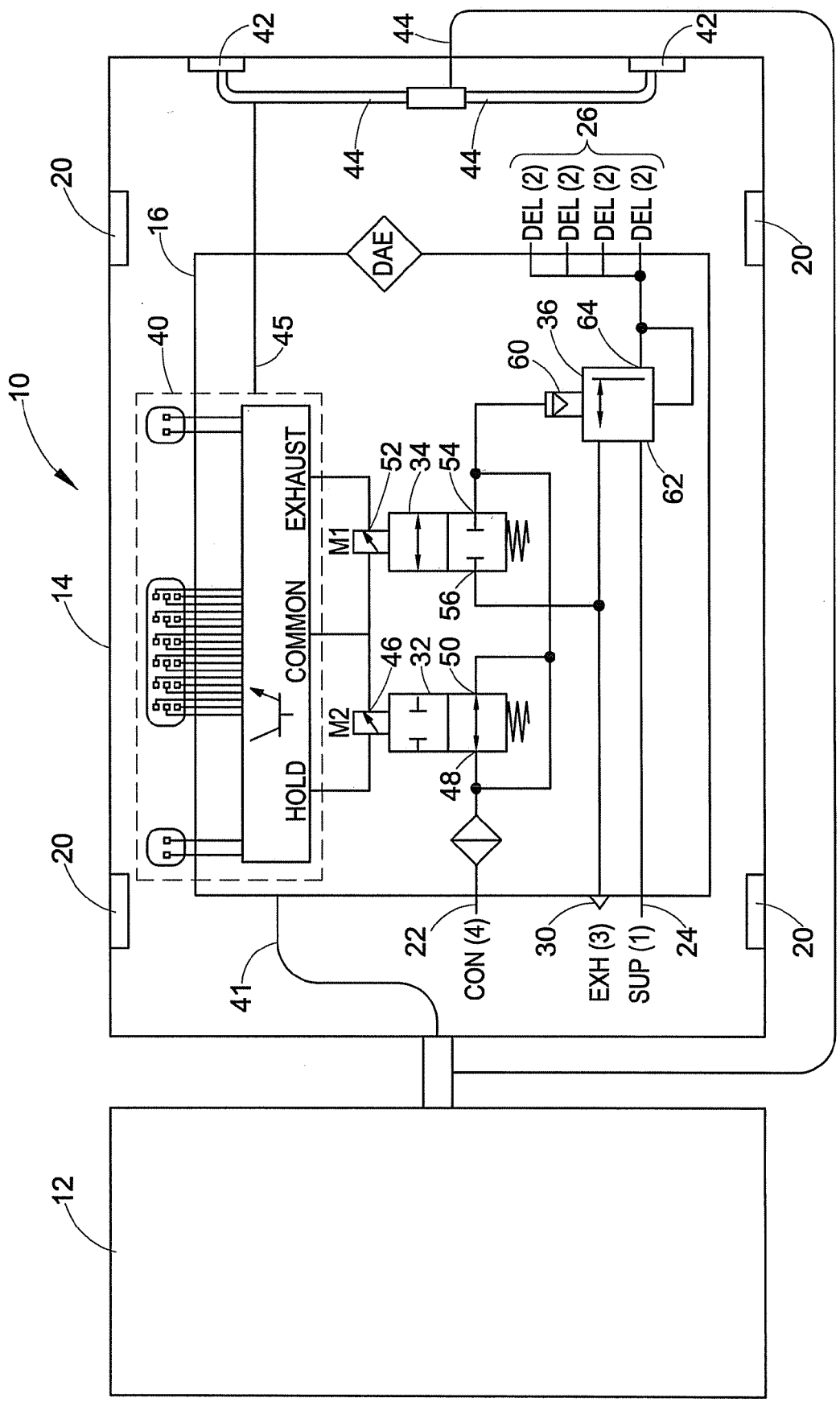

HEAVY VEHICLE TRAILER ABS MODULE

BACKGROUND

The present invention relates to an antilock braking system (ABS) of a heavy vehicle. It finds particular application in conjunction with a trailer ABS relay valve and will be described with particular reference thereto. It will be appreciated, however, that the invention is also amenable to other applications.

It is not uncommon for heavy vehicles to include both a tractor and trailer. Tractor-trailer ABS units include a trailer ABS module including a valve that acts as a relay valve during normal braking, but during ABS events, helps improve stability. An air signal transmitted to a control port of the ABS module is transmitted to a control port of the relay valve via a solenoid valve, which is normally open during normal braking operation. For example, air transmitted to the ABS module control port may be transmitted to the relay valve control port (via the solenoid valve) for setting the relay valve in a delivery mode (e.g., passing compressed air from a supply port to a delivery port of the relay valve). During an ABS event, the solenoid is alternately switched between the normally open position and a closed position, which causes the brakes to be alternately applied.

At times, it is desirable to exhaust the compressed air at the relay valve control port. However, under certain conditions, when the solenoid valve is closed, compressed air from the ABS module control port becomes trapped at the relay valve control port.

Current ABS module designs include a one-way check valve for ensuring a pressure at the relay valve control port is not higher than a pressure at the ABS module control port. The check valve increases manufacturing costs and complexity of the ABS module.

The present invention provides a new and improved apparatus and method which addresses the above-referenced problems.

SUMMARY

A heavy vehicle trailer antilock braking system module includes a module control port receiving a pressure signal, a module exhaust port fluidly communicating with atmosphere, a first switching valve, a second switching valve, a relay valve, and control logic. The first switching valve includes an input port and an output port. The first switching valve input port fluidly communicates with the module control port. The second switching valve includes an input port and an output port. The second switching valve output port fluidly communicates with the module exhaust port. A relay valve includes a supply port, a delivery port, an exhaust port, and a control port. The relay valve control port fluidly communicates with the first switching valve output port and the second switching valve input port. The delivery port fluidly communicates with the supply port and the exhaust port as a function of a pressure signal at the relay valve control port. Control logic causes the second switching valve input port to fluidly communicate with the second switching valve output port for a predetermined time after electrical power is no longer supplied to a vehicle service brake stop lamp.

BRIEF DESCRIPTION OF THE DRAWING

In the accompanying drawing which is incorporated in and constitutes a part of the specification, embodiments of the invention are illustrated, which, together with a general description of the invention given above, and the detailed description given below, serve to exemplify the embodiments of this invention.

FIG. 1 illustrates a schematic representation of a vehicle including a trailer ABS module in accordance with one embodiment of an apparatus illustrating principles of the present invention.

DETAILED DESCRIPTION OF ILLUSTRATED EMBODIMENT

With reference to FIG. 1, a simplified component diagram of an exemplary vehicle 10 is illustrated in accordance with one embodiment of the present invention. In one embodiment, the vehicle 10 is a heavy vehicle and includes a tractor portion 12 and a trailer portion 14. The vehicle 10 also includes an antilock braking system (ABS). The vehicle ABS includes a trailer antilock braking system module 16 ("trailer ABS module") on the trailer portion 14. The trailer ABS module 16 controls application of service brakes 20 on the trailer portion 14.

The trailer ABS module 16 includes a module control port 22, a module supply port 24, at least one module delivery port 26, a module exhaust port 30, a first switching valve 32, a second switching valve 34, and a relay valve 36. Control logic 40, which electrically communicates with the vehicle's ignition power via an electrical line 41, controls operation of the first and second switching valves 32, 34, respectively. As discussed in more detail below, the control logic 40 is capable of sensing whether electrical power is supplied to service brake stop lamps 42 on the vehicle via a service brake stop lamp power line 44. The service brake stop lamp power line 44 electrically communicates with the vehicle's power (from, for example, the tractor 12) via a service brake stop lamp switch (not shown). Although, for purposes of illustration, the line 44 is shown as outside of the trailer 14, it is also contemplated that the line 44 would be included on or within the trailer 14 (like the line 41). In one embodiment, the service brake stop lamps 42 are illuminated when a vehicle service brake pedal is depressed, which causes the service brake stop lamp switch to close so that power is supplied to the stop lamps 42 via the stop lamp power line 44. The control logic 40 is contemplated to be included as part of an ABS electronic control unit (ECU). In addition, it is contemplated in one embodiment that the control logic 40 monitors the power supplied to the service brake stop lamps 42 via a wire 45 electrically communicating with both the stop lamp power line 44 and the control logic 40.

The first switching valve 32 includes a first switching valve control input 46, a first input port 48, and a first output port 50. The second switching valve 34 includes a second switching valve control input 52, a second input port 54, and a second output port 56. In the illustrated embodiment, the first and second switching valve control inputs 46, 52, respectively, receive respective electrical control signals from the control logic 40. In one embodiment, the first and second switching valves 32, 34 are solenoids in an antilock braking system. The first switching valve 32 acts as a hold solenoid and the second switching valve 34 acts as an exhaust solenoid.

In one embodiment, the first input port 48 fluidly communicate with the first output port 50 when no electronic control signal is present at the first switching valve control input 46 (e.g., not transmitted from the control logic 40 to the first switching valve control input 46). Conversely, the first input port 48 does not fluidly communicate with the first output port 50 when an electronic control signal is present at the first switching valve control input 46 (e.g., is transmitted from the control logic 40 to the first switching valve control input 46). Therefore, the first switching valve 32 is referred to as being "normally open." At the same time, the second input port 54 does not fluidly communicate with the second output port 56 when no electronic control signal is present at the second switching valve control input 52 (e.g., not transmitted from the control logic 40 to the second switching valve control input 52). Also, the second input port 54 does fluidly communicate with the second output port 56 when an electronic control signal is present at the second switching valve control input 52 (e.g., is transmitted from the control logic 40 to the second switching valve control input 52). Therefore, the second switching valve 34 is referred to as being "normally closed."

The relay valve 36 includes a relay control port 60, a relay supply port 62 that fluidly communicates with the module supply port 24, a relay delivery port 64 that fluidly communicates with the module delivery ports 26, and a relay exhaust port 66 that fluidly communicates with the module exhaust port 30.

The first input port 48 of the first switching valve 32 fluidly communicates with the module control port 22. The first output port 50 of the first switching valve 32 fluidly communicates with the relay valve control port 60. The second input port 54 of the second switching valve 34 fluidly communicates with the module exhaust port 30. The second output port 56 of the second switching valve 34 fluidly communicates with the relay valve control port 60.

During normal braking conditions, since the first switching valve 32 is normally open, a pressure signal at the module control port 22 is fluidly communicated to the relay control port 60 via the first input port 48 and the first output port 50. The pressure signal at the module control port 22 is delivered, for example, as a function of the vehicle service brake pedal being depressed by an operator of the vehicle. In addition, since the second switching valve is normally closed, neither the first output port 50 nor the relay control port 60 fluidly communicates with the second input port 54 and, therefore, does not fluidly communicate with the module exhaust port 30.

During an ABS event, it may be desirable to pulse application of the trailer service brakes 20. Under these conditions, the control logic 40 alternately applies an electronic control signal to the first switching valve control input 46. Application of the electronic control signal to the first input port 48 sets the first switching valve 32 into a "closed" state. When the first switching valve 32 is in the closed state, any pressure signal at the module control port 22 is prevented from passing to the relay valve control port 60 because the first input port 48 does not fluidly communicate with the first output port 50. Because the control logic 40 alternately applies the electronic control signal to the first switching valve control input 46 during the ABS event, the trailer service brakes 20 are alternately applied. In other words, the trailer service brakes 20 are pulsed.

If the vehicle operator releases the service brake pedal during an ABS event, the pulsing of the trailer service brakes 20 should cease and the trailer service brakes 20 should be released. While the service brake pedal is depressed, power is supplied to the vehicle brake stop lamps 42 via the service brake stop lamp power line 44 for illuminating the vehicle stop lamps 42. Releasing the service brake pedal (whether during an ABS event or normal braking mode) causes the power to no longer be supplied to the vehicle stop lamps 42 via the service brake stop lamp power line 44 and, therefore, the vehicle brake stop; lamps 42 are no longer illuminated. If the control logic 40 senses there is no power in the service brake stop lamp power line 44 (e.g., the vehicle service brake stop lamps 42 are not illuminated) during an ABS event, the control logic 40 transmits an electronic signal to the first switching valve control input 46 for setting the first switching device 32 to a closed state. Once the first switching device 32 is set to the closed state, it is possible that compressed air from the pressure signal may be trapped between the first output port 50 of the first switching device 32 and the relay control port 60 of the relay valve 36. Therefore, when the control logic 40 senses power is not supplied to the vehicle brake stop lamps 42 via the service brake stop lamp power line 44 (e.g., the vehicle service brake stop lamps 42 are not illuminated) during an ABS event, the control logic 40 also transmits an electronic signal to the second switching valve control input 52 to set the second switching valve 34 into an open state for a predetermined period of time (e.g., ≦~3 seconds).

When the second switching valve 34 is in the open state, any pressure signal at the relay valve control port 60 is exhausted to atmosphere via the module exhaust port 30 since the second input port 54 fluidly communicates with the second output port 56. Therefore, any pressure signal trapped between the first switching device 32 and the relay valve 36 is exhausted via the second output port 56.

Exhausting the relay valve control port 60 to atmosphere for a predetermined time after the power is not supplied to the vehicle brake stop lamps 42 via the service brake stop lamp power line 44 (e.g., the vehicle service brake stop lamps 42 are not illuminated after the vehicle service brake pedal is released) during an ABS event, ensures no pressure signal is present at the relay valve control port 60 even if a control pressure signal is transmitted from the module control port 22 to the relay valve control port 60 (e.g., while the first switching valve input port 48 is fluidly communicating with the first switching valve output port 50). In addition, exhausting the relay valve control port 60 to atmosphere for a predetermined time after power is not supplied to the vehicle brake stop lamps 42 via the service brake stop lamp power line 44 (e.g., the vehicle service brake stop lamps 42 are not illuminated after the vehicle service brake pedal is released) during an ABS event, ensures no residual pressure signal is present at the relay valve control port 60 even if the first switching valve input port 48 is prevented from fluidly communicating with the first switching valve output port 50.

Ensuring that no control pressure signal is present at the relay valve control port 60 when power is not supplied to the vehicle brake stop lamps 42 via the service brake stop lamp power line 44 after an ABS event ensures the trailer service brakes 20 are not undesirably applied once the vehicle service brake pedal is released.

As discussed above, it is contemplated that the control logic 40 is included as part of an ABS ECU. In general, the control logic 40 includes a means for controlling passage of a pressure signal from the module control port 22 to the relay valve control port 60 as a function of a brake event request. In one embodiment, it is contemplated that the means for controlling includes the first switching valve 32 (e.g., a hold solenoid) and the electronic signal transmitted from the control logic 40 to the first switching valve 32. The control logic 40 also includes a means for exhausting the pressure signal from the relay valve control port 60 for a predetermined time after the brake event is no longer requested (e.g., after power is no longer supplied to the vehicle brake stop lamps 42 via the service brake stop lamp power line 44 and/or the service brake stop lamps 42 are no longer illuminated). The means for exhausting is contemplated to include the second switching valve 34 (e.g., an exhaust solenoid).

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. An electronic control unit (ECU) for controlling a heavy vehicle trailer antilock braking system module, the ECU comprising:
   means for controlling passage of a pressure signal from a module control port to a valve control port as a function of a brake event request;
   means for determining the brake event is no longer requested; and
   means for exhausting any residual pressure signal from the valve control port for a predetermined time after the brake event is no longer requested.

2. The ECU for controlling a heavy vehicle trailer antilock braking system module as set forth in claim 1, wherein the means for controlling includes:
   a hold solenoid including an input port fluidly communicating with a control port of the module and an output port fluidly communicating with the valve control port.

3. The ECU for controlling a heavy vehicle trailer antilock braking system module as set forth in claim 2, wherein the means for exhausting includes:
   an exhaust solenoid including an input port fluidly communicating with the valve control port and an output port fluidly communicating with an exhaust port of the module.

4. The ECU for controlling a heavy vehicle trailer antilock braking system module as set forth in claim 3, wherein:
   the means for controlling provides fluid communication between the hold solenoid input port and the hold solenoid output port for passing the pressure signal from the module control port to the valve control port as a function of the brake event request.

5. The ECU for controlling a heavy vehicle trailer antilock braking system module as set forth in claim 3, wherein:
   the means for exhausting provides fluid communication between the exhaust solenoid input port and the exhaust solenoid output port, during the predetermined time, for exhausting the pressure signal from the valve control port as a function of the brake event request.

6. The ECU for controlling a heavy vehicle trailer antilock braking system module as set forth in claim 1, wherein:
   the means for determining determines the brake event is no longer requested once electrical power is no longer supplied to a vehicle service brake stop lamp.

7. A method for controlling a heavy vehicle trailer antilock braking system module, the method comprising:
   controlling passage of a pressure signal from a module control port to a valve control port as a function of a brake event request;
   determining when electrical power is no longer supplied to a vehicle service brake stop lamp for determining when the brake event is no longer requested; and
   after the electrical power is no longer supplied to the vehicle brake stop lamp, ensuring no residual pressure signal is present at the valve control port by exhausting any residual pressure signal from the valve control port to atmosphere for a predetermined time after the brake event is no longer requested.

8. The method for controlling a heavy vehicle trailer antilock braking system module as set forth in claim 7, wherein the controlling step includes:
   providing fluid communication between an input port of a hold solenoid and an output port of the hold solenoid for passing the pressure signal from the module control port to the valve control port as a function of the brake event request.

9. The method for controlling a heavy vehicle trailer antilock braking system module as set forth in claim 8, further including:
   providing fluid communication between an input port of an exhaust solenoid and an output port of the exhaust solenoid, during the predetermined time, for exhausting the pressure signal from the valve control port as a function of the brake event request.

10. The method for controlling a heavy vehicle trailer antilock braking system module as set forth in claim 9, further including:
    alternately providing the fluid communication between the exhaust solenoid input port and the exhaust solenoid output port during the predetermined time.

* * * * *